United States Patent
Zewail et al.

(10) Patent No.: US 12,127,186 B2
(45) Date of Patent: Oct. 22, 2024

(54) SPS/CG ACTIVATION WITH MULTI-PDSCH/PUSCH DCI

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Qingjiang Tian, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/653,100

(22) Filed: Mar. 1, 2022

(65) Prior Publication Data

US 2023/0055679 A1     Feb. 23, 2023

Related U.S. Application Data

(60) Provisional application No. 63/234,185, filed on Aug. 17, 2021.

(51) Int. Cl.
*H04W 72/1263* (2023.01)
*H04W 72/23* (2023.01)

(52) U.S. Cl.
CPC ....... *H04W 72/1263* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0374875 A1* | 11/2020 | Li | H04L 5/0064 |
| 2021/0153267 A1* | 5/2021 | Zhang | H04W 72/23 |
| 2021/0227528 A1* | 7/2021 | Bang | H04W 72/1268 |

(Continued)

FOREIGN PATENT DOCUMENTS

WO     2021084504 A1     5/2021

OTHER PUBLICATIONS

Apple Inc: "Discussion on PDSCH and PUSCH Enhancements for NR above 52.6 GHz", 3GPP TSG RAN WG1 #106b-e, R1-2107730, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038617, 39 Pages, paragraph [05.3] paragraph [10.4].

(Continued)

*Primary Examiner* — Kenny S Lin
(74) *Attorney, Agent, or Firm* — Procopio, Cory, Hargreaves & Savitch

(57) ABSTRACT

Apparatus and method to allow for the activation of SPS/G with multi-PDSCH/PUSCH. The apparatus receives DCI comprising a TDRA assignment that is configured with multiple PUSCHs or multiple PDSCHs. The apparatus selects a first SLIV of a TDRA row indicated by the TDRA assignment comprising one or more SLIVs to activate SPS or a CG. The apparatus transmits the multiple PUSCHs or receiving the multiple PDSCHs based on a selected SLIV of the TDRA row. The apparatus may select the first SLIV for transmission of the multiple PUSCHs or reception of the multiple PDSCHs if a row indicated by the DCI comprises a plurality of SLIVs.

30 Claims, 11 Drawing Sheets

(56) References Cited

U.S. PATENT DOCUMENTS

| | | |
|---|---|---|
| 2021/0227570 A1* | 7/2021 | Park .................. H04L 1/189 |
| 2021/0288842 A1* | 9/2021 | Chatterjee ............. H04L 5/0044 |
| 2021/0378006 A1* | 12/2021 | Takeda ................. H04W 52/04 |
| 2022/0150832 A1* | 5/2022 | Yang ................... H04W 72/23 |
| 2022/0159692 A1* | 5/2022 | Lee .................... H04L 5/0053 |
| 2022/0216944 A1* | 7/2022 | Muruganathan .. H04W 72/0446 |

OTHER PUBLICATIONS

Huawei : "Feature Lead Summary#2 of HARQ Enhancements for NR-U", 3GPP TSG RAN WG1 Meeting #99, R1-1913418, 3rd Generation Partnership Project, Mobile Competence Centre, 650, Route Des Lucioles, F-06921 Sophia-Antipolis Cedex, France, Vol. RAN WG1, No. Reno, USA, Nov. 18, 2019-Nov. 22, 2019, Nov. 25, 2019, XP051830697, 43 Pages, paragraph [0003].
International Search Report and Written Opinion—PCT/US2022/036139—ISA/EPO—Sep. 23, 2022.

* cited by examiner

Default PUSCH time domain resource allocation A for normal CP

| Row Index | PUSCH Mapping Type | $K_2$ | $S$ | $L$ |
|---|---|---|---|---|
| 1 | Type A | $j$ | 0 | 14 |
| 2 | Type A | $j$ | 0 | 12 |
| 3 | Type A | $j$ | 0 | 10 |
| 4 | Type B | $j$ | 2 | 10 |
| 5 | Type B | $j$ | 4 | 10 |
| 6 | Type B | $j$ | 4 | 8 |
| 7 | Type B | $j$ | 4 | 6 |
| 8 | Type A | $j+1$ | 0 | 14 |
| 9 | Type A | $j+1$ | 0 | 12 |
| 10 | Type A | $j+1$ | 0 | 10 |
| 11 | Type A | $j+2$ | 0 | 14 |
| 12 | Type A | $j+2$ | 0 | 12 |
| 13 | Type A | $j+2$ | 0 | 10 |
| 14 | Type B | $j$ | 8 | 6 |
| 15 | Type A | $j+3$ | 0 | 14 |
| 16 | Type A | $j+3$ | 0 | 10 |

Default PDSCH time domain resource allocation A for normal CP

| Row Index | dmrs-TypeA-Position | PUSCH Mapping Type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type B | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 7 |
| 8 | 2,3 | Type A | 0 | 5 | 2 |
| 9 | 2,3 | Type A | 0 | 5 | 2 |
| 10 | 2,3 | Type B | 0 | 9 | 2 |
| 11 | 2,3 | Type A | 0 | 12 | 13 |
| 12 | 2,3 | Type A | 0 | 1 | 6 |
| 13 | 2,3 | Type A | 0 | 1 | 4 |
| 14 | 2,3 | Type B | 0 | 2 | 7 |
| 15 | 2,3 | Type B | 0 | 4 | 4 |
| 16 | 2,3 | Type B | 0 | 8 | 4 |

FIG. 5

| Row Index | PUSCH Mapping Type | K2 | SLIV |
|---|---|---|---|
| 0 | Type A/B | (0,…,32) | (0,…,127) |
| 1 | Type A/B | (0,…,32) | (0,…,127) |
| 15 | Type A/B | (0,…,32) | (0,…,127) |

SPS/CG ACTIVATION WITH MULTI-PDSCH/PUSCH DCI

CROSS REFERENCE TO RELATED APPLICATION(S)

This application claims the benefit of and priority to U.S. Provisional Application Ser. No. 63/234,185, entitled "SPS/CG Activation with Multi-PDSCH/PUSCH DCI" and filed on Aug. 17, 2021, which is expressly incorporated by reference herein in its entirety.

TECHNICAL FIELD

The present disclosure relates generally to communication systems, and more particularly, to a configuration to allow the activation of semi-persistent scheduling (SPS)/configured grant (CG) with multi-physical downlink shared channel (PDSCH)/physical uplink shared channel (PUSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives downlink control information (DCI) comprising a time domain resource allocation (TDRA) assignment that is configured with multiple physical uplink shared channels (PUSCHs) or multiple physical downlink shared channels (PDSCHs). The apparatus selects a first start and length indicator value (SLIV) of a TDRA row indicated by the TDRA assignment comprising one or more SLIVs to activate semi-persistent scheduling (SPS) or a configured grant (CG). The apparatus transmits the multiple PUSCHs or receives the multiple PDSCHs based on a selected SLIV of the TDRA row.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), downlink control information (DCI) comprising a time domain resource allocation (TDRA) assignment that is configured with multiple physical uplink shared channels (PUSCHs) or multiple physical downlink shared channels (PDSCHs). The apparatus transmits the multiple PDSCHs or receives the multiple PUSCHs based on a selected start and length indicator value (SLIV) of a TDRA row, selected by the UE, wherein the selected SLIV of the TDRA row indicated by the TDRA assignment comprises one or more SLIVs to activate semi-persistent scheduling (SPS) or a configured grant (CG).

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram of a TDRA table for PDSCH.

DETAILED DESCRIPTION

Figure 1:
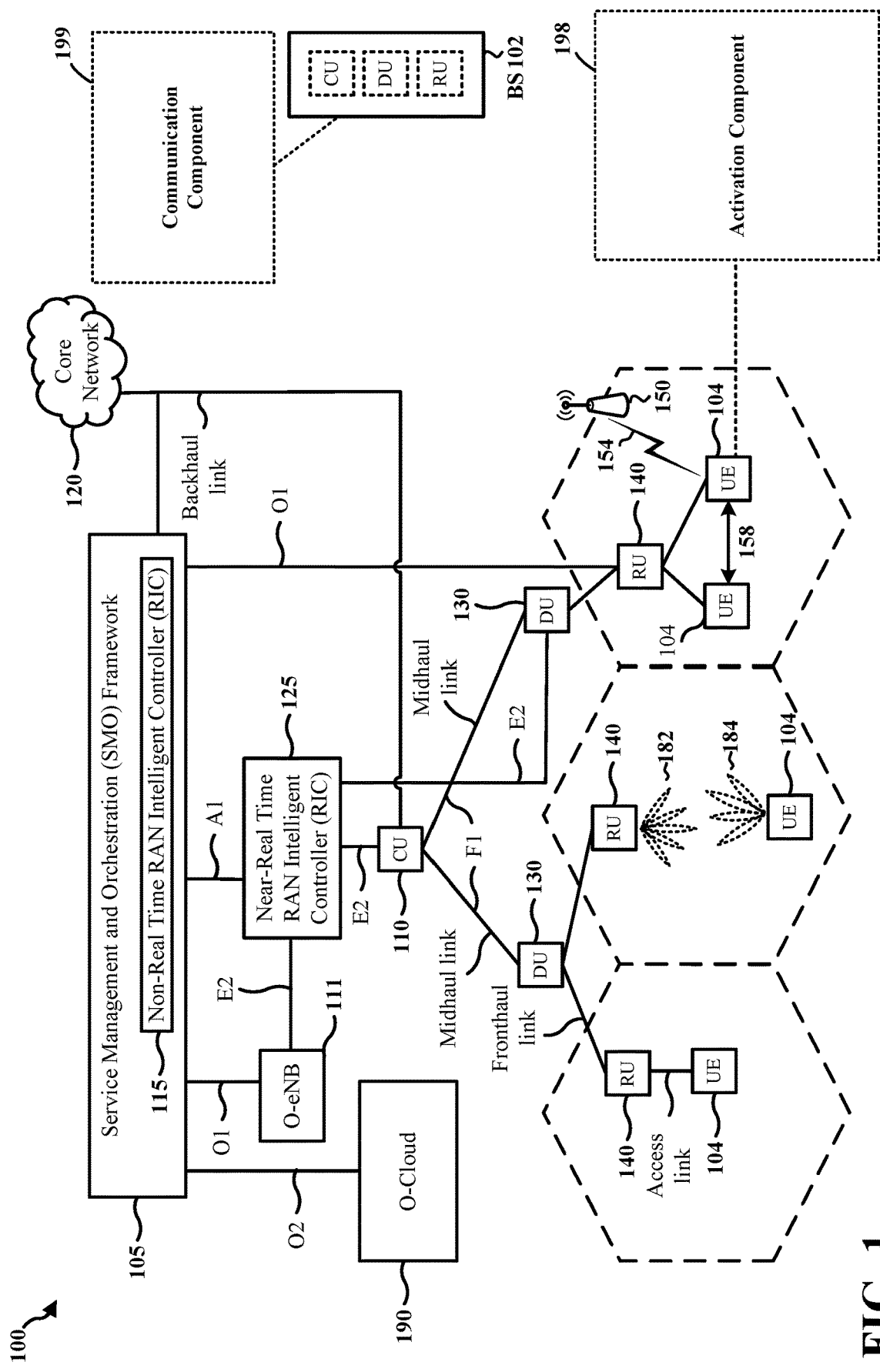
FIG. 1 is a diagram illustrating an example of a wireless communications system and an access network.

In wireless communication systems, SPS for a PDSCH may be configured via RRC, while a CG for PUSCH may be configured via RRC. A base station may provide the configuration for the PDSCH via SPS or the configuration for the PUSCH via CG, and the base station may transmit, to a UE, DCI that activates the reception of the PDSCH via SPS or transmission of the PUSCH via CG. Multi-PUSCH and multi-PDSCH may be utilized to reduce control overhead. For example, one DCI may be utilized to schedule multiple PUSCHs/PDSCHs. The multiple PUSCHs/PDSCHs may share the same modulation and coding scheme (MCS) and/or the frequency domain resource allocation (FDRA) in an effort to reduce overhead. Some TDRA rows may have multiple SLIVs which may allow for configuring multiple PUSCHs/PDSCHs grants using a single DCI. An RRC configured table for a single transport block (TB) grant may provide a table for PUSCH. To use a single non-fallback DCI to activate SPS/CG, the TDRA row that has a single SLIV may be used to activate CG with DCI that supports multi-PUSCH. However, this may limit the flexibility of scheduling and configuring the TDRA table.

Aspects presented herein provide a configuration to allow for the activation of SPS/CG with multi-PDSCH/PUSCH. The configuration may allow the use of any row in the TDRA table to activate SPS/CG. In some instances, a DCI load may be based on the number of SLIVs indicated by the TDRA assignment.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The commu-nication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to select any row in a TDRA table to activate SPS/CG. For example, the UE 104 may comprise an activation component 198 configured to select any row in a TDRA table to activate SPS/CG. The UE 104 may receive DCI comprising a TDRA assignment that is configured with multiple PUSCHs or multiple PDSCHs. The UE 104 may select a first SLIV of a TDRA row indicated by the TDRA assignment comprising one or more SLIVs to activate SPS or a CG. The UE 104 may transmit the multiple PUSCHs or receiving the multiple PDSCHs based on a selected SLIV of the TDRA row.

Referring again to FIG. 1, in certain aspects, the base station 102 may be configured to communicate with a UE 104 via SPS/CG activated by the UE based on a selected row in a TDRA table. For example, the base station 102 may comprise a communication component 199 configured to communicate with a UE 104 via SPS/CG activated by the UE based on a selected row in a TDRA table. The base station 102 may transmit, to a UE 104, DCI comprising a TDRA assignment that is configured with multiple PUSCHs or multiple PDSCHs. The base station 102 may transmit the multiple PDSCHs or receiving the multiple PUSCHs based on a selected SLIV of a TDRA row, selected by the UE, wherein the selected SLIV of the TDRA row indicated by the TDRA assignment comprises one or more SLIVs to activate SPS or a CG.

Although the following description may be focused on 5G NR, the concepts described herein may be applicable to other similar areas, such as LTE, LTE-A, CDMA, GSM, and other wireless technologies.

Figure 2:
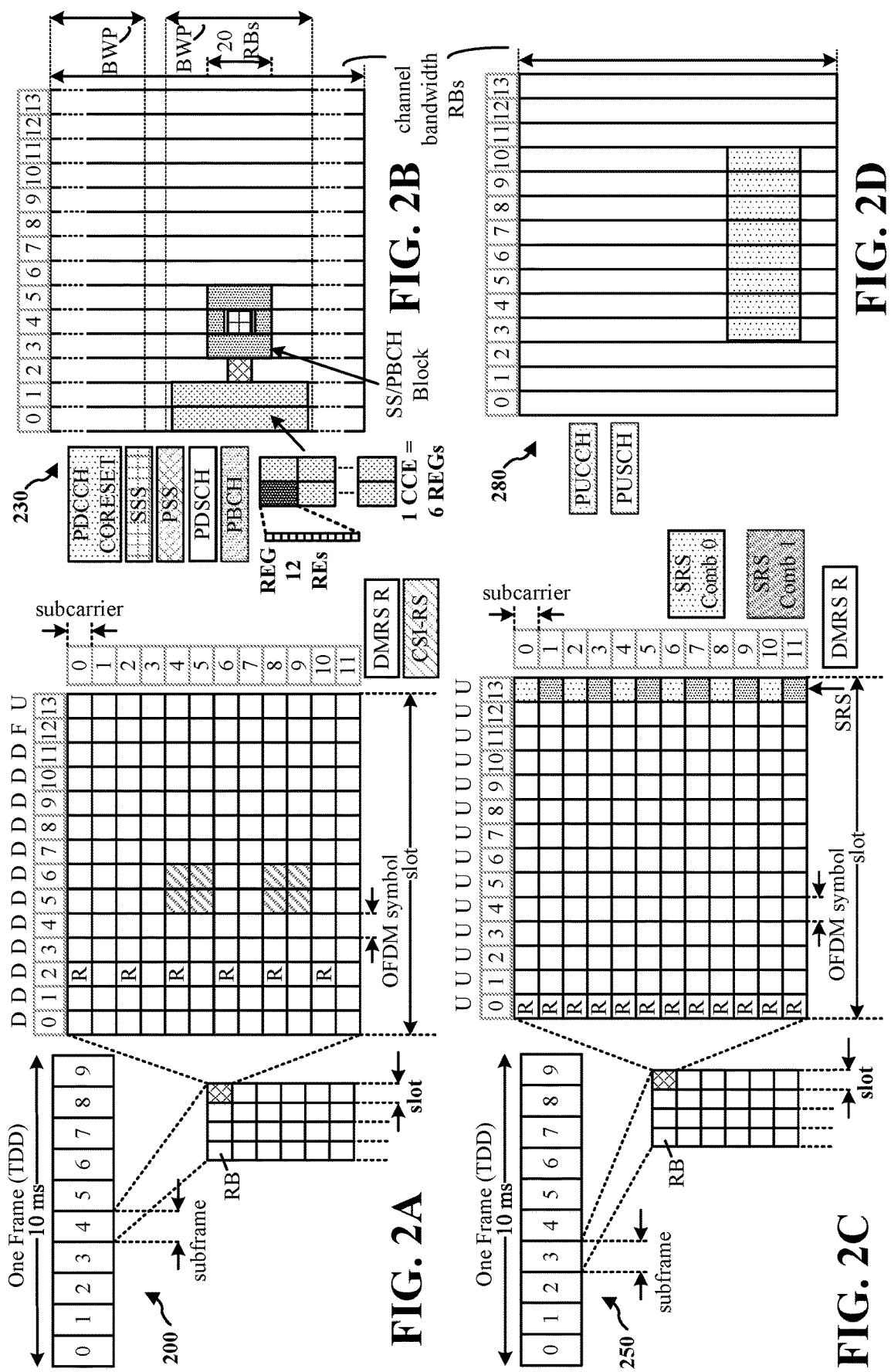
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
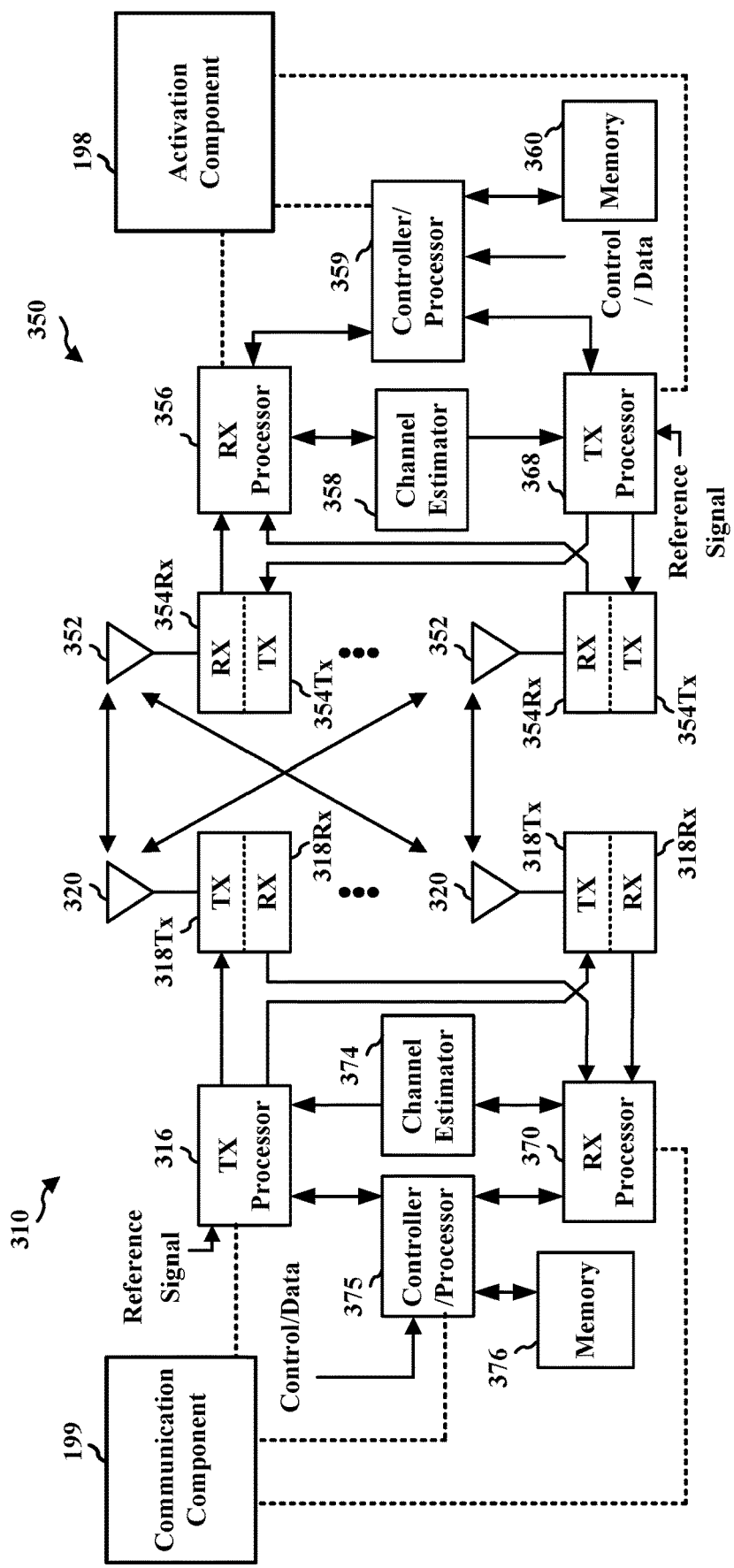
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the activation component 198 of FIG. 1.

At least one of the TX processor 316, the RX processor 370, and the controller/processor 375 may be configured to perform aspects in connection with the communication component 199 of FIG. 1.

In wireless communication systems, SPS for a PDSCH may be configured via RRC, while a CG for PUSCH may be configured via RRC. A base station may provide the configuration for the PDSCH via SPS or the configuration for the PUSCH via CG, and the base station may transmit, to a UE, DCI that activates the reception of the PDSCH via SPS or transmission of the PUSCH via CG. The base station may transmit another DCI to the UE instructing the UE to release the resources after the scheduled data has been transmitted/received.

Figure 4:
FIG. 4 is a diagram of a TDRA table for PUSCH.
Figure 6:
FIG. 6 is a diagram table for a single transport block grant.

Multi-PUSCH and multi-PDSCH may be utilized to reduce control overhead. For example, one DCI may be utilized to schedule multiple PUSCHs/PDSCHs. The multiple PUSCHs/PDSCHs may share the same modulation and coding scheme (MCS) and/or the frequency domain resource allocation (FDRA) in an effort to reduce overhead. Some of the TDRA rows, as shown for example in diagram 400 of FIG. 4 or diagram 500 of FIG. 5, may have multiple SLIVs which may allow for configuring multiple PUSCHs/PDSCHs grants using a single DCI. An RRC configured table for a single transport block (TB) grant, as shown for example in diagram 600 of FIG. 6, may provide a table for PUSCH. To use a single non-fallback DCI to activate SPS/CG, the TDRA row that has a single SLIV may be used to activate CG with DCI that supports multi-PUSCH. However, this may limit the flexibility of scheduling and configuring the TDRA table.

Aspects presented herein provide a configuration to allow for the activation of SPS/CG with multi-PDSCH/PUSCH. The configuration may allow the use of any row in the TDRA table to activate SPS/CG. In some instances, a DCI load may be based on the number of SLIVs indicated by the TDRA assignment.

In some instances, if the row indicated by the DCI has multiple SLIVs, the UE may use the first SLIV and neglect or ignore the other SLIVs. The DCI may indicate an index pointing to one of the rows of the TDRA table. Each row may have one or more SLIVs. If multi-PDSCH is allowed for transmission via SPS and multi-PUSCH is allowed for transmission via CG, then the two modes may be distinguished, such as a single allocation SPS/CG or multiple allocations SPS/CG. RRC may configure either multi-PDSCH or single PDSCH over SPS, as well as multi-PUSCH or single PUSCH over CG. If the UE is configured with multi-PDSCH/PUSCH via SPS/CG, the base station may still be able to schedule the UE with a single allocation if the base station signaled a row with a single SLIV in the activation DCI.

The interpretation of the DCI fields may be based on whether one SLIV is indicated or whether more than one SLIV is in the TDRA. For example, the new data indicator (NDI) may be 1 bit if the number of scheduled PUSCH indicated by the TDRA assignment field is 1. Otherwise the NDI may be 2, 3, 4, 5, 6, 7, or 8 bits based on the maximum number of PUSCH that may be scheduled among all entries in the higher layer parameter pusch-TimeDomainAllocationListForMultiPUSCH, where each bit may correspond to one scheduled PUSCH.

In some instances, if the first SLIV is only considered for activation, then the NDI may comprise one bit, which may be based on configured scheduling radio network temporary identifier (CS-RNTI) and NDI=0. The bit size for the redundancy version (RV), the code block group transmission information (CBGTI), and the uplink shared channel (UL-SCH) indicator may also be considered to be single SLIV field, which may provide for some savings in DCI overhead. In some instances, the field sizes may be based on the number of SLIVs in the TDRA field. This may be allowable for SPS/CG, since code block group (CBG)-based is not supported and UL-SCH indicator for CG is not needed. DCI overhead may be reduced for CG based on CBG/UL-SCH indicator being needed for a single PUSCH. The DCI size may be based on max{N+N, 1+2+CBGTI size+1}, where N is the max number of SLIVs. If the number of information bits in DCI format 0_1 scheduling a single PUSCH, prior to padding, is not equal to the number of information bits in DCI format 0_1 scheduling multiple PUSCHs for the same serving cell, then one or more zeros may be appended to the DCI format 0_1 having the smaller size until the payload size is the same for scheduling a single PUSCH and multiple PUSCHs.

Figure 7:
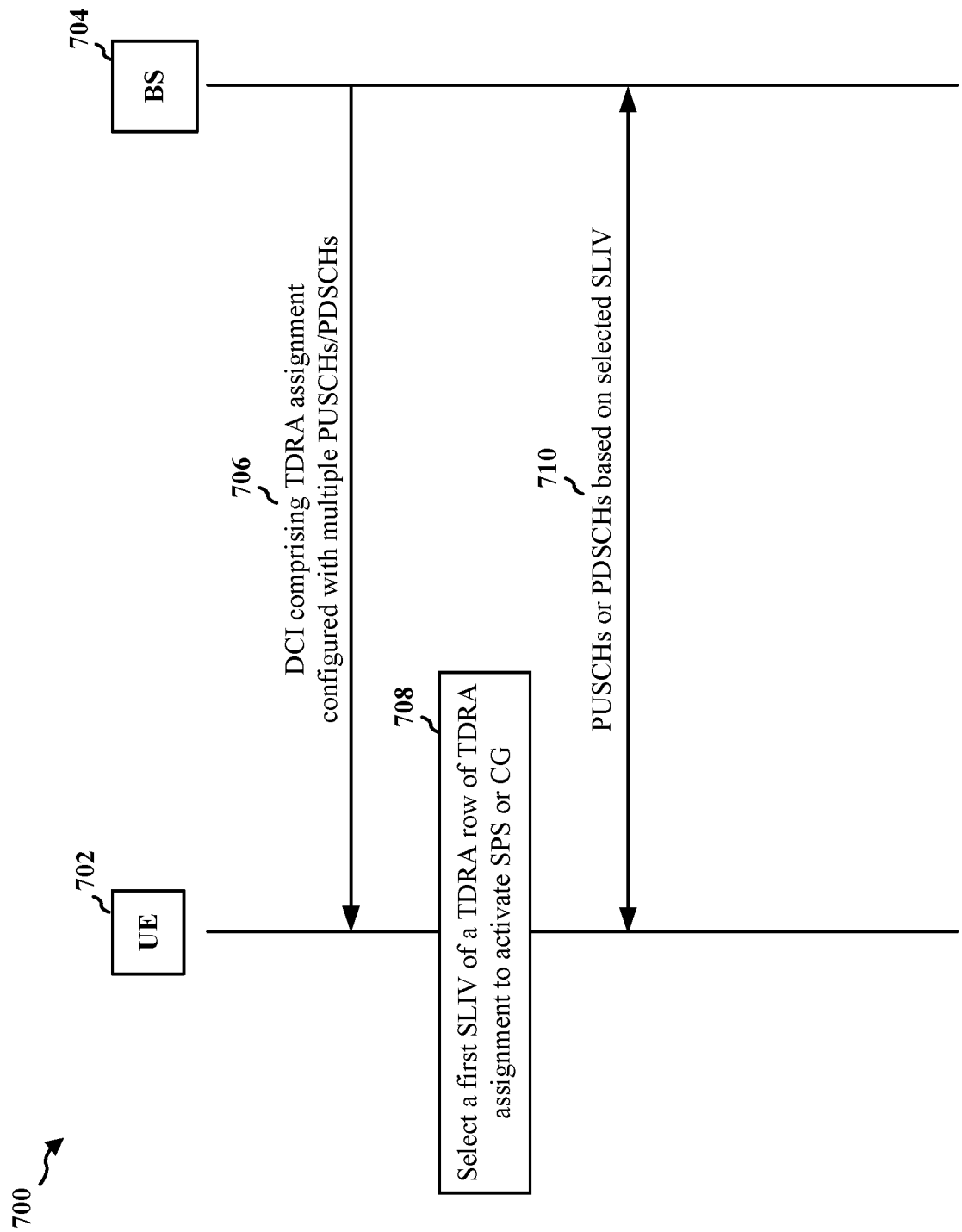
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102. Further, a UE 702 may correspond to at least UE 104. In another example, in the context of FIG. 3, the base station 704 may correspond to base station 310 and the UE 702 may correspond to UE 350.

At 706, the base station 704 may transmit DCI comprising a TDRA assignment. The base station may transmit the DCI to the UE 702. The UE 702 may receive the DCI comprising the TDRA assignment from the base station 704. The DCI may be configured with multiple PUSCHs or multiple PDSCHs. In some aspects, a new data indicator of the DCI may comprise one bit if the selected SLIV is utilized for activation of the SPS or CG. A size of an RV field may be based on a number of SLIVs. In some aspects, the size of the RV field may comprise 2 bits where the number of SLIVs is one. The size of the RV field may comprise 2, 3, 4, 5, 6, 7, or 8 bits for a plurality of SLIVs and may be based on a maximum number of SLIVs in the TDRA assignment. In some aspects, an UL-SCH may comprise one bit where the number of SLIVs is one. The UL-SCH may comprise zero bits for a plurality of SLIVs. In some aspects, CBG transmission information may comprise 0, 2, 4, 6, or 8 bits where the number of SLIVs is one. The CBG transmission information may comprise zero bits for a plurality of SLIVs. In some aspects, field sizes of the DCI may be based on a maximum number of SLIVs among the rows of the TDRA assignment.

At 708, the UE 702 may select a first SLIV of a TDRA row indicated by the TDRA assignment comprising one or more SLIVs to activate SPS or CG. In some aspects, the first SLIV may be selected for transmission of the multiple PUSCHs or reception of the multiple PDSCHs if a row indicated by the DCI comprises a plurality of SLIVs. In some aspects, a new data indicator of the DCI may comprise one bit if the first SLIV is utilized for activation of the SPS or CG. A size of the RV field may be based on a number of SLIVs. In some aspects, the size of the RV field may comprise 2 bits where the number of SLIVs is one. The size of the RV field may comprise 2, 3, 4, 5, 6, 7, or 8 bits for a plurality of SLIVs and based on a maximum number of SLIVs in the TDRA assignment. In some aspects, an UL-SCH may comprise one bit where the number of SLIVs is one. The UL-SCH may comprise zero bits for a plurality of SLIVs. In some aspects, CBG transmission information may comprise 0, 2, 4, 6, or 8 bits where the number of SLIVs is one. The CBG transmission information may comprise zero bits for a plurality of SLIVs.

At 710, the UE 702 may transmit the multiple PUSCHs or may receive the multiple PDSCHs based on a selected SLIV of the TDRA row. The UE may transmit the multiple PUSCHs to the base station 704. The base station 704 may receive the multiple PUSCHs from the UE 702. The base station 704 may transmit the multiple PDSCHs to the UE 702. The UE 702 may receive the multiple PDSCHs from the base station 704. In some aspects, transmission of the multiple PDSCHs may be configured via SPS, and transmission of the multiple PUSCHs may be configured via CG. In some aspects, the DCI may schedule a single allocation for SPS or CG. In some aspects, the DCI may schedule a plurality of allocations for each SPS or CG. In some aspects, the single allocation for SPS or CG may be configured via RRC signaling. The single allocation may comprise a single PDSCH over SPS or a single PUSCH over CG. In some aspects, the plurality of allocations for SPS or CG may be configured via RRC signaling. The plurality of allocations may comprise a plurality of PDSCHs over SPS or a plurality of PUSCHs over CG.

Figure 8:
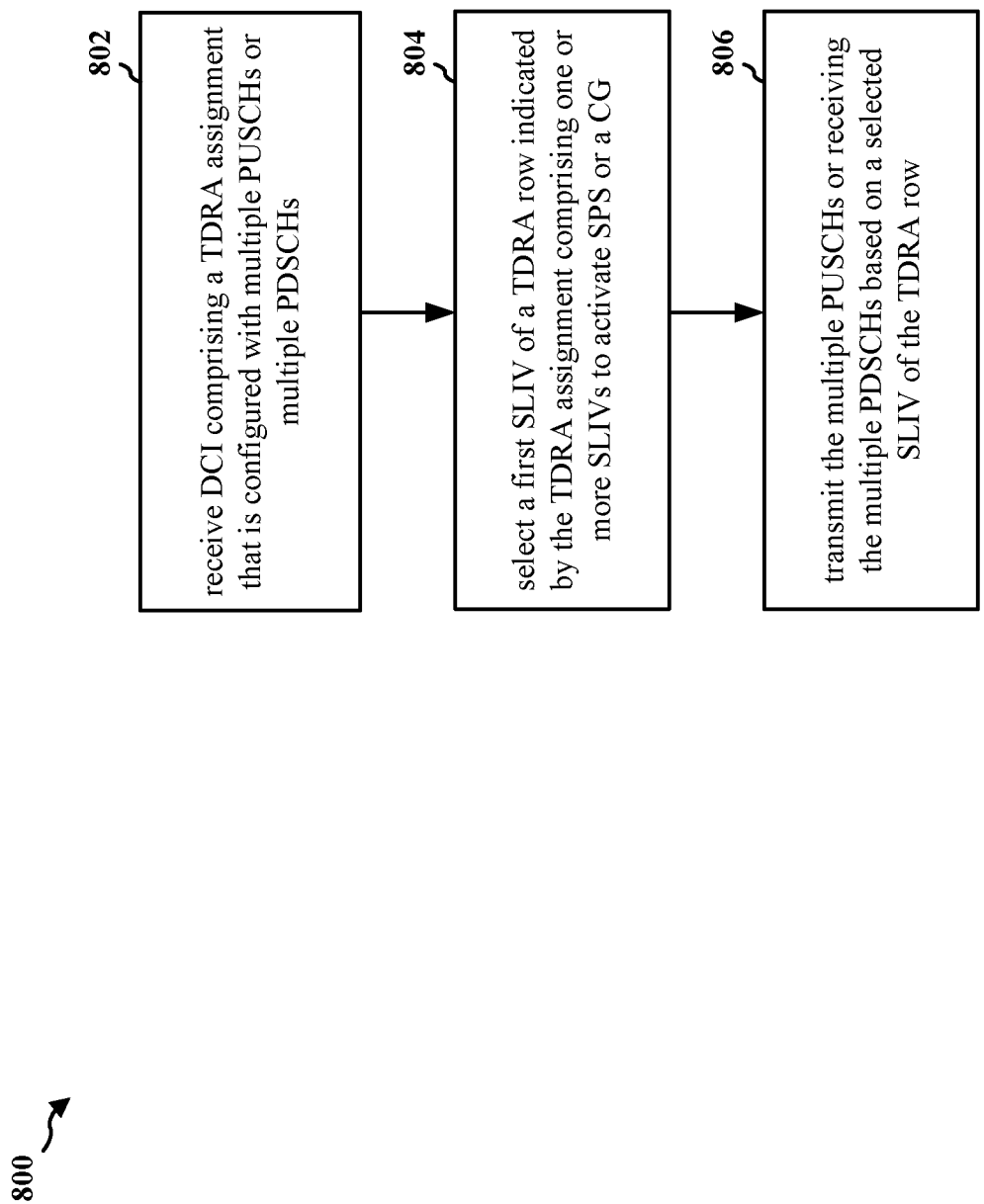
FIG. 8 is a flowchart of a method of wireless communication.

FIG. 8 is a flowchart 800 of a method of wireless communication. The method may be performed by a UE (e.g., the UE 104; the apparatus 1104). One or more of the illustrated operations may be omitted, transposed, or contemporaneous. The method may allow a UE to use any row in a TDRA table to activate SPS/CG.

At 802, the UE may receive DCI comprising a time domain resource allocation (TDRA) assignment. For example, 802 may be performed by activation component 198 of apparatus 1104. The UE may receive the DCI from a base station. The DCI may comprise the TDRA assignment that may be configured with multiple PUSCHs or multiple PDSCHs. In some aspects, field sizes of the DCI may be based on a maximum number of start and length indicator values (SLIVs) among the rows of the TDRA assignment.

At 804, the UE may select a first SLIV of a TDRA row indicated by the TDRA assignment comprising one or more SLIVs to activate SPS or CG. For example, 804 may be performed by activation component 198 of apparatus 1104. In some aspects, a new data indicator of the DCI may comprise one bit if the first SLIV is utilized for activation of the SPS or CG. A size of a RV field may be based on a number of SLIVs. In some aspects, the size of the RV field may comprise 2 bits where the number of SLIVs is one. The size of the RV field may comprise 2, 3, 4, 5, 6, 7, or 8 bits for a plurality of SLIVs and based on a maximum number of SLIVs in the TDRA assignment. In some aspects, an UL-SCH may comprise one bit where the number of SLIVs is one. The UL-SCH may comprise zero bits for a plurality of SLIVs. In some aspects, CBG transmission information may comprise 0, 2, 4, 6, or 8 bits where the number of SLIVs is one. The CBG transmission information may comprise zero bits for a plurality of SLIVs.

At 806, the UE may transmit the multiple PUSCHs or may receive the multiple PDSCHs based on a selected SLIV of the TDRA row. For example, 806 may be performed by activation component 198 of apparatus 1104. In some aspects, transmission of the multiple PDSCHs may be configured via SPS, and transmission of the multiple PUSCHs may be configured via CG. In some aspects, the DCI may schedule a single allocation for SPS or CG. In some aspects, the DCI may schedule a plurality of allocations for each SPS or CG. In some aspects, the single allocation for SPS or CG may be configured via RRC signaling. The single allocation may comprise a single PDSCH over SPS or a single PUSCH over CG. In some aspects, the plurality of allocations for SPS or CG may be configured via RRC signaling. The plurality of allocations may comprise a plurality of PDSCHs over SPS or a plurality of PUSCHs over CG.

Figure 9:
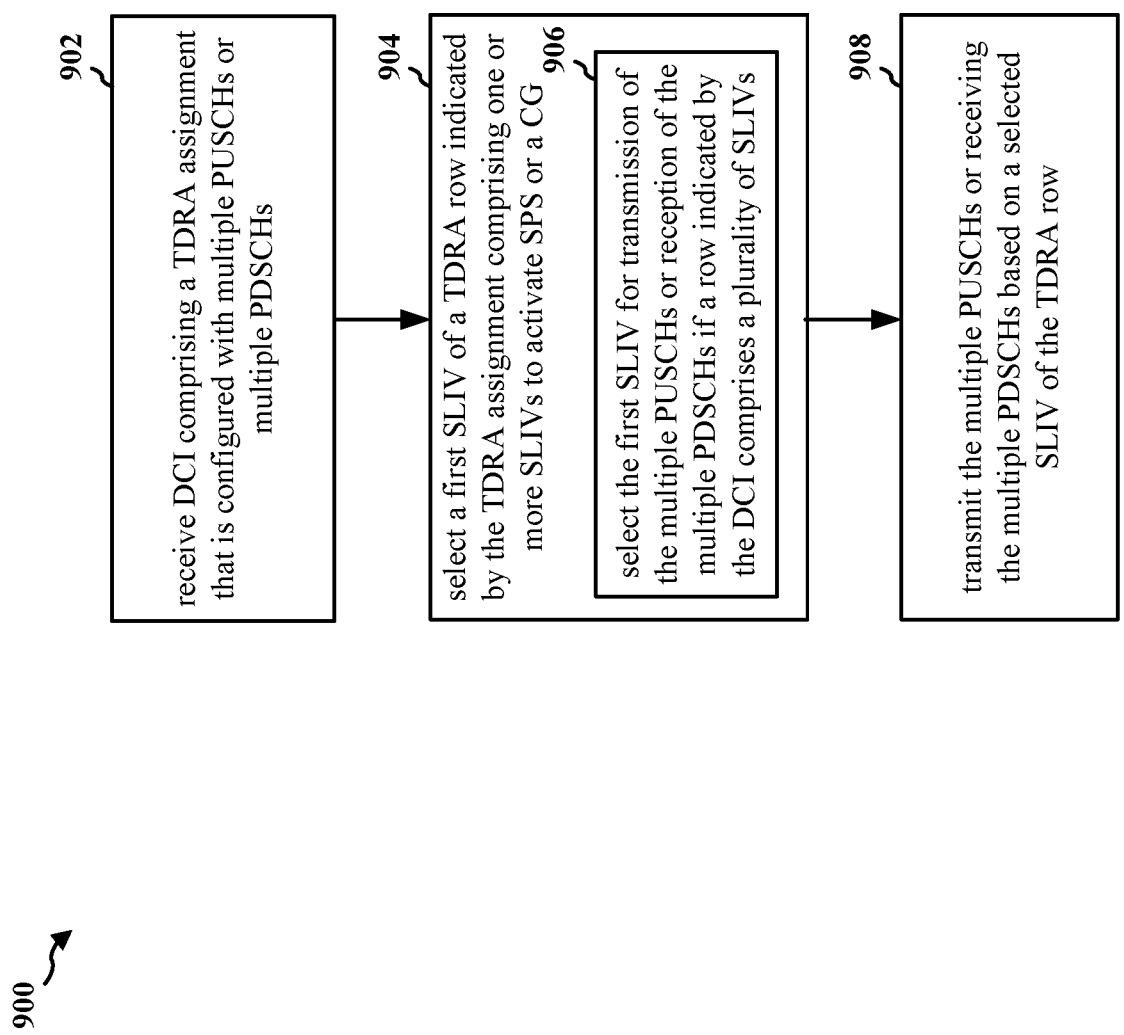
FIG. 9 is a flowchart of a method of wireless communication.

FIG. 9 is a flowchart 900 of a method of wireless communication. The method may be performed by a UE (e.g., the UE 104; the apparatus 1104). One or more of the illustrated operations may be omitted, transposed, or contemporaneous. The method may allow a UE to use any row in a TDRA table to activate SPS/CG.

At 902, the UE may receive DCI comprising a TDRA assignment. For example, 902 may be performed by activation component 198 of apparatus 1104. The UE may receive the DCI from a base station. The DCI may comprise the TDRA assignment that may be configured with multiple PUSCHs or multiple PDSCHs. In some aspects, field sizes of the DCI may be based on a maximum number of SLIVs among the rows of the TDRA assignment.

At 904, the UE may select a first SLIV of a TDRA row indicated by the TDRA assignment comprising one or more SLIVs to activate SPS or CG. For example, 904 may be performed by activation component 198 of apparatus 1104. In some aspects, for example at 906, the first SLIV may be selected for transmission of the multiple PUSCHs or reception of the multiple PDSCHs if a row indicated by the DCI comprises a plurality of SLIVs. In some aspects, a new data indicator of the DCI may comprise one bit if the first SLIV is utilized for activation of the SPS or CG. A size of a RV field may be based on a number of SLIVs. In some aspects, the size of the RV field may comprise 2 bits where the number of SLIVs is one. The size of the RV field may comprise 2, 3, 4, 5, 6, 7, or 8 bits for a plurality of SLIVs and based on a maximum number of SLIVs in the TDRA assignment. In some aspects, an UL-SCH may comprise one bit where the number of SLIVs is one. The UL-SCH may comprise zero bits for a plurality of SLIVs. In some aspects, CBG transmission information may comprise 0, 2, 4, 6, or 8 bits where the number of SLIVs is one. The CBG transmission information may comprise zero bits for a plurality of SLIVs.

At 908, the UE may transmit the multiple PUSCHs or may receive the multiple PDSCHs based on a selected SLIV of the TDRA row. For example, 908 may be performed by activation component 198 of apparatus 1104. In some aspects, transmission of the multiple PDSCHs may be configured via SPS, and transmission of the multiple PUSCHs may be configured via CG. In some aspects, the DCI may schedule a single allocation for SPS or CG. In some aspects, the DCI may schedule a plurality of allocations for each SPS or CG. In some aspects, the single allocation for SPS or CG may be configured via RRC signaling. The single allocation may comprise a single PDSCH over SPS or a single PUSCH over CG. In some aspects, the plurality of allocations for SPS or CG may be configured via RRC signaling. The plurality of allocations may comprise a plurality of PDSCHs over SPS or a plurality of PUSCHs over CG.

Figure 10:
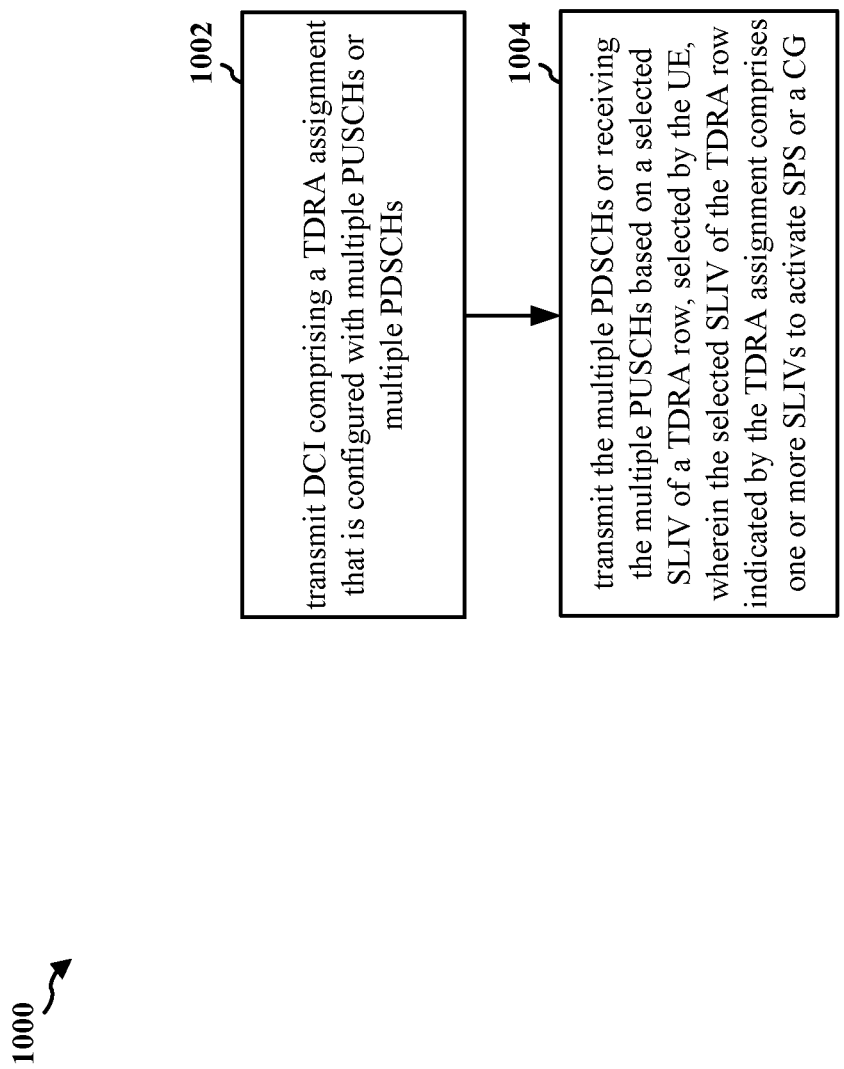
FIG. 10 is a flowchart of a method of wireless communication.

FIG. 10 is a flowchart 1000 of a method of wireless communication. The method may be performed by a base station (e.g., the base station 102; the network entity 1102). One or more of the illustrated operations may be omitted, transposed, or contemporaneous. The method may allow a base station to communicate with a UE via SPS/CG activated by the UE based on a selected row in a TDRA table.

At 1002, the base station may transmit DCI comprising a TDRA assignment. For example, 1002 may be performed by communication component 199 of network entity 1102. The base station may transmit the DCI to a UE. The DCI may be configured with multiple PUSCHs or multiple PDSCHs. In some aspects, a new data indicator of the DCI may comprise one bit if the selected SLIV is utilized for activation of the SPS or CG. A size of an RV field may be based on a number of SLIVs. In some aspects, the size of the RV field may comprise 2 bits where the number of SLIVs is one. The size of the RV field may comprise 2, 3, 4, 5, 6, 7, or 8 bits for a plurality of SLIVs and may be based on a maximum number of SLIVs in the TDRA assignment. In some aspects, an UL-SCH may comprise one bit where the number of SLIVs is one. The UL-SCH may comprise zero bits for a plurality of SLIVs. In some aspects, CBG transmission information may comprise 0, 2, 4, 6, or 8 bits where the number of SLIVs is one. The CBG transmission information may comprise zero bits for a plurality of SLIVs. In some aspects, field sizes of the DCI may be based on a maximum number of SLIVs among the rows of the TDRA assignment.

At 1004, the base station may transmit the multiple PDSCHs or receive the multiple PUSCHs based on a selected SLIV of a TDRA row. For example, 1004 may be performed by communication component 199 of network entity 1102. The selected SLIV of the TDRA row may be selected by the UE. The selected SLIV of the TDRA row indicated by the TDRA assignment may comprise one or more SLIVs to activate SPS or a CG. In some aspects, transmission of the multiple PDSCHs may be configured via SPS, and transmission of the multiple PUSCHs may be configured via CG. In some aspects, the DCI may schedule a single allocation for SPS or CG. In some aspects, the DCI may schedule a plurality of allocations for each SPS or CG. In some aspects, the single allocation for SPS or CG may be configured via RRC signaling. The single allocation may comprise a single PDSCH over SPS or a single PUSCH over CG. In some aspects, the plurality of allocations for SPS or CG may be configured via RRC signaling. The plurality of allocations may comprise a plurality of PDSCHs over SPS or a plurality of PUSCHs over CG.

Figure 11:
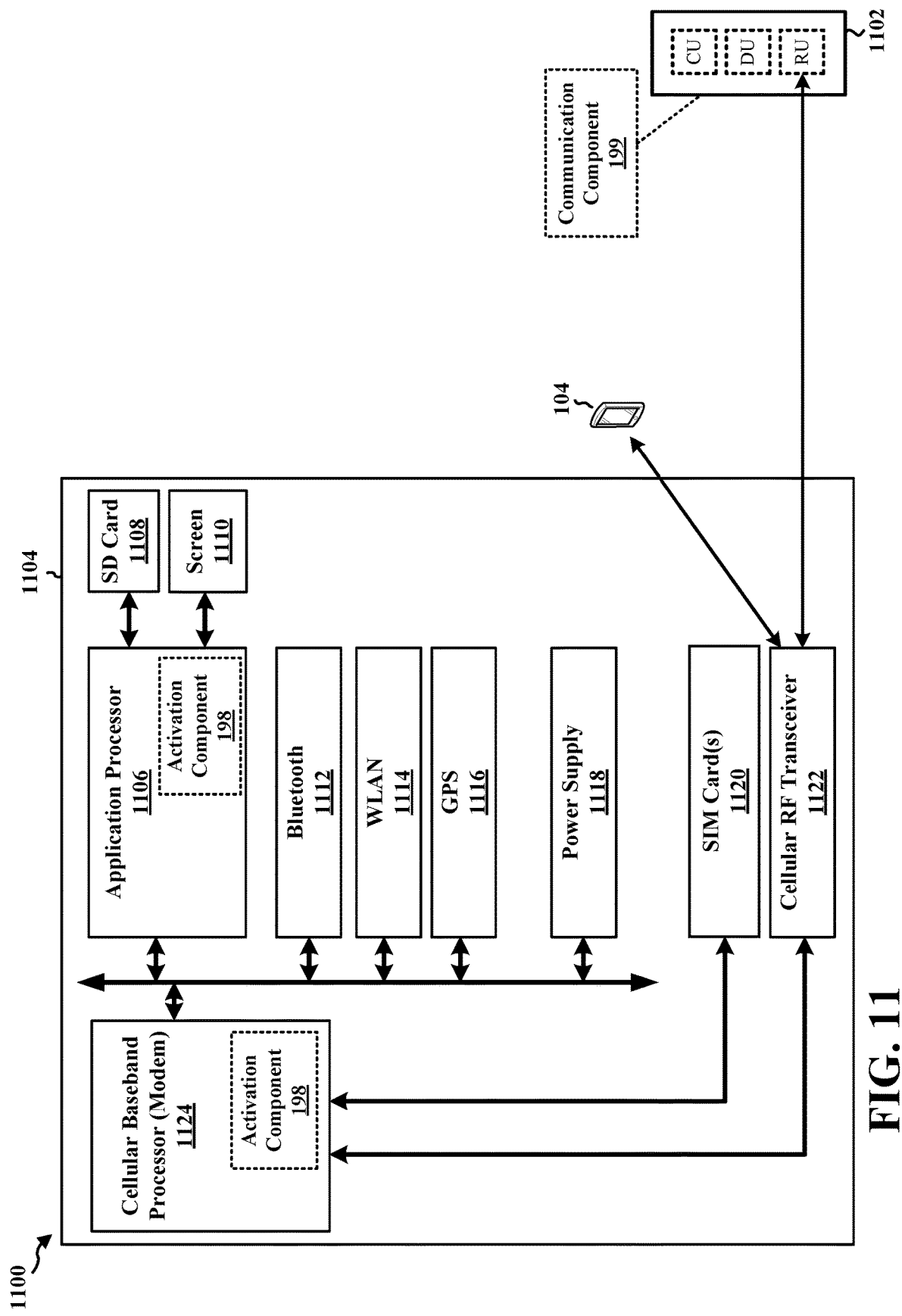
FIG. 11 is a diagram illustrating an example of a hardware implementation for an example apparatus and/or network entity.

FIG. 11 is a diagram 1100 illustrating an example of a hardware implementation for an apparatus 1104 and a network entity 1102. The apparatus 1104 may be a UE, a component of a UE, or may implement UE functionality. The network entity 1102 may be a BS, a component of a BS, or may implement BS functionality. In some aspects, the apparatus 1104 may include a cellular baseband processor 1124 (also referred to as a modem) coupled to a cellular RF transceiver 1122. In some aspects, the apparatus 1104 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1124 communicates through the cellular RF transceiver 1122 with the UE 104 and/or with an RU associated with the network entity 1102. The RU is either part of the network entity 1102 or is in communication with the network entity 1102. The network entity 1102 may include one or more of the CU, DU, and the RU. The cellular baseband processor 1124 and the application processor 1106 may each include a computer-readable medium/memory. Each computer-readable medium/memory may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the activation component 198 is configured to receive DCI comprising a TDRA assignment that is configured with multiple PUSCHs or multiple PDSCHs; select a first SLIV of a TDRA row indicated by the TDRA assignment comprising one or more SLIVs to activate SPS or a CG; and transmit the multiple PUSCHs or receiving the multiple PDSCHs based on the selected first SLIV of the TDRA row. The activation component 198 may be within the cellular baseband processor 1124, the application processor 1106, or both the cellular baseband processor 1124 and the application processor 1106. The activation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving DCI comprising a TDRA assignment that is configured with multiple PUSCHs or multiple PDSCHs; means for selecting a first SLIV of a TDRA row indicated by the TDRA assignment comprising one or more SLIVs to activate SPS or a CG; means for transmitting the multiple PUSCHs or receiving the multiple PDSCHs based on the selected first SLIV of the TDRA row; and means for selecting the first SLIV for transmission of the multiple PUSCHs or reception of the multiple PDSCHs if a row indicated by the DCI comprises a plurality of SLIVs. The means may be the activation component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the communication component 199 is configured to transmit DCI comprising a TDRA assignment that is configured with multiple PUSCHs or multiple PDSCHs; and transmit the multiple PDSCHs or receiving the multiple PUSCHs based on a selected SLIV of a TDRA row, wherein the selected SLIV of the TDRA row indicated by the TDRA assignment comprises one or more SLIVs to activate SPS or a CG. The communication component 199 may be within one or more processors (e.g., BBU(s)) of one or more of the CU, DU, and the RU. The communication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for transmitting DCI comprising a TDRA assignment that is configured with multiple PUSCHs or multiple PDSCHs; and transmit the multiple PDSCHs or receiving the multiple PUSCHs based on a selected SLIV of a TDRA row, wherein the selected SLIV of the TDRA row indicated by the TDRA assignment comprises one or more SLIVs to activate SPS or a CG. The means may be the communication component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for wireless communication at a UE, receiving DCI comprising a TDRA assignment that is configured with multiple PUSCHs or multiple PDSCHs; selecting a first SLIV of a TDRA row indicated by the TDRA assignment comprising one or more SLIVs to activate SPS or a CG; and transmitting the multiple PUSCHs or receiving the multiple PDSCHs based on a selected SLIV of the TDRA row.

Aspect 2 is the method of aspect 1, further including selecting the first SLIV for transmission of the multiple PUSCHs or reception of the multiple PDSCHs if a row indicated by the DCI comprises a plurality of SLIVs.

Aspect 3 is the method of any of aspects 1 and 2, further includes that transmission of the multiple PDSCHs is configured via the SPS, and the transmission of the multiple PUSCHs is configured via the CG.

Aspect 4 is the method of any of aspects 1-3, further includes that the DCI schedules a single allocation for the SPS or the CG.

Aspect 5 is the method of any of aspects 1-4, further includes that the DCI schedules a plurality of allocations for each of the SPS or the CG.

Aspect 6 is the method of any of aspects 1-5, further includes that the single allocation for the SPS or the CG is configured via RRC signaling, wherein the single allocation comprises a single PDSCH over the SPS or a single PUSCH over the CG.

Aspect 7 is the method of any of aspects 1-6, further includes that the plurality of allocations for the SPS or the CG are configured via RRC signaling, wherein the plurality of allocations comprise a plurality of PDSCHs over the SPS or a plurality of PUSCHs over the CG.

Aspect 8 is the method of any of aspects 1-7, further includes that a new data indicator of the DCI comprises one bit if the first SLIV is utilized for activation of the SPS or the CG, wherein a size of a RV field is based on a number of SLIVs.

Aspect 9 is the method of any of aspects 1-8, further includes that the size of the RV field comprises 2 bits where the number of SLIVs is one, wherein the size of the RV field comprises 2, 3, 4, 5, 6, 7, or 8 bits for a plurality of SLIVs and based on a maximum number of SLIVs in the TDRA assignment.

Aspect 10 is the method of any of aspects 1-9, further includes that an UL-SCH comprises one bit where the number of SLIVs is one, wherein the UL-SCH comprises zero bits for a plurality of SLIVs.

Aspect 11 is the method of any of aspects 1-10, further includes that CBG transmission information comprises 0, 2, 4, 6, or 8 bits where the number of SLIVs is one, wherein the CBG transmission information comprises zero bits for a plurality of SLIVs.

Aspect 12 is the method of any of aspects 1-11, further includes that field sizes of the DCI are based on a maximum number of SLIVs among rows of the TDRA assignment.

Aspect 13 is an apparatus for wireless communication at a UE including at least one processor coupled to a memory and at least one transceiver, the at least one processor configured to implement any of Aspects 1-12.

Aspect 14 is an apparatus for wireless communication at a UE including means for implementing any of Aspects 1-12.

Aspect 15 is a computer-readable medium storing computer executable code, where the code when executed by a processor causes the processor to implement any of Aspects 1-12.

Aspect 16 is a method of wireless communication at a network node, comprising transmitting DCI comprising a TDRA assignment that is configured with multiple PUSCHs or multiple PDSCHs; and transmitting the multiple PDSCHs or receiving the multiple PUSCHs based on a selected SLIV of a TDRA row, wherein the selected SLIV of the TDRA row indicated by the TDRA assignment comprises one or more SLIVs to activate SPS or a CG.

Aspect 17 is the method of aspect 16, further includes that transmission of the multiple PDSCHs is configured via the SPS, and transmission of the multiple PUSCHs is configured via the CG.

Aspect 18 is the method of any of aspects 16 and 17, further includes that the DCI schedules a single allocation for the SPS or the CG.

Aspect 19 is the method of any of aspects 16-18, further includes that the DCI schedules a plurality of allocations for each of the SPS or the CG.

Aspect 20 is the method of any of aspects 16-19, further includes that the single allocation for the SPS or the CG is configured via RRC signaling, wherein the single allocation comprises a single PDSCH over the SPS or a single PUSCH over the CG.

Aspect 21 is the method of any of aspects 16-20, further includes that the plurality of allocations for the SPS or the CG are configured via RRC signaling, wherein the plurality of allocations comprise a plurality of PDSCHs over the SPS or a plurality of PUSCHs over the CG.

Aspect 22 is the method of any of aspects 16-21, further includes that a new data indicator of the DCI comprises one bit if the selected SLIV is utilized for activation of the SPS or the CG, wherein a size of a RV field is based on a number of SLIVs.

Aspect 23 is the method of any of aspects 16-22, further includes that the size of the RV field comprises 2 bits where the number of SLIVs is one, wherein the size of the RV field comprises 2, 3, 4, 5, 6, 7, or 8 bits for a plurality of SLIVs and based on a maximum number of SLIVs in the TDRA assignment.

Aspect 24 is the method of any of aspects 16-23, further includes that an UL-SCH comprises one bit where the number of SLIVs is one, wherein the UL-SCH comprises zero bits for a plurality of SLIVs.

Aspect 25 is the method of any of aspects 16-24, further includes that CBG transmission information comprises 0, 2, 4, 6, or 8 bits where the number of SLIVs is one, wherein the CBG transmission information comprises zero bits for a plurality of SLIVs.

Aspect 26 is the method of any of aspects 16-25, further includes that field sizes of the DCI are based on a maximum number of SLIVs among rows of the TDRA assignment.

Aspect 27 is an apparatus for wireless communication at a network node including at least one processor coupled to a memory and at least one transceiver, the at least one processor configured to implement any of Aspects 16-26.

Aspect 28 is an apparatus for wireless communication at a network node including means for implementing any of Aspects 16-26.

Aspect 29 is a computer-readable medium storing computer executable code, where the code when executed by a processor causes the processor to implement any of Aspects 16-26.

What is claimed is:

1. An apparatus for wireless communication at a user equipment (UE), comprising:
    a memory; and
    at least one processor coupled to the memory and configured to:
       receive downlink control information (DCI) comprising a time domain resource allocation (TDRA) assignment that is configured with multiple physical uplink shared channels (PUSCHs) or multiple physical downlink shared channels (PDSCHs);
       select a first start and length indicator value (SLIV) of a TDRA row indicated by the TDRA assignment comprising one or more SLIVs to activate semi-persistent scheduling (SPS) or a configured grant (CG); and
       transmit the multiple PUSCHs or receiving the multiple PDSCHs based on the selected first SLIV of the TDRA row.

2. The apparatus of claim 1, further comprising a transceiver coupled to the at least one processor, wherein the transceiver is configured to receive the DCI, and at least one of transmit the multiple PUSCHs or receive the multiple PDSCHs.

3. The apparatus of claim 1, wherein the at least one processor is further configured to:
    select the first SLIV for transmission of the multiple PUSCHs or reception of the multiple PDSCHs if a row indicated by the DCI comprises a plurality of SLIVs.

4. The apparatus of claim 1, wherein transmission of the multiple PDSCHs is configured via the SPS, and the transmission of the multiple PUSCHs is configured via the CG.

5. The apparatus of claim 4, wherein the DCI schedules a single allocation for the SPS or the CG.

6. The apparatus of claim 5, wherein the single allocation for the SPS or the CG is configured via radio resource control (RRC) signaling, wherein the single allocation comprises a single PDSCH over the SPS or a single PUSCH over the CG.

7. The apparatus of claim 4, wherein the DCI schedules a plurality of allocations for each of the SPS or the CG.

8. The apparatus of claim 7, wherein the plurality of allocations for the SPS or the CG are configured via radio resource control (RRC) signaling, wherein the plurality of allocations comprise a plurality of PDSCHs over the SPS or a plurality of PUSCHs over the CG.

9. The apparatus of claim 1, wherein a new data indicator of the DCI comprises one bit if the first SLIV is utilized for activation of the SPS or the CG, wherein a size of a redundancy version (RV) field is based on a number of SLIVs.

10. The apparatus of claim 9, wherein the size of the RV field comprises 2 bits where the number of SLIVs is one, wherein the size of the RV field comprises 2, 3, 4, 5, 6, 7, or 8 bits for a plurality of SLIVs and based on a maximum number of SLIVs in the TDRA assignment.

11. The apparatus of claim 9, wherein an uplink shared channel (UL-SCH) comprises one bit where the number of SLIVs is one, wherein the UL-SCH comprises zero bits for a plurality of SLIVs.

12. The apparatus of claim 9, wherein code block group (CBG) transmission information comprises 0, 2, 4, 6, or 8 bits where the number of SLIVs is one, wherein the CBG transmission information comprises zero bits for a plurality of SLIVs.

13. The apparatus of claim 1, wherein field sizes of the DCI are based on a maximum number of start and length indicator values (SLIVs) among rows of the TDRA assignment.

14. A method of wireless communication at a user equipment (UE), comprising:
receiving downlink control information (DCI) comprising a time domain resource allocation (TDRA) assignment that is configured with multiple physical uplink shared channels (PUSCHs) or multiple physical downlink shared channels (PDSCHs);
selecting a first start and length indicator value (SLIV) of a TDRA row indicated by the TDRA assignment comprising one or more SLIVs to activate semi-persistent scheduling (SPS) or a configured grant (CG); and
transmitting the multiple PUSCHs or receiving the multiple PDSCHs based on the selected first SLIV of the TDRA row.

15. The method of claim 14, further comprising:
selecting the first SLIV for transmission of the multiple PUSCHs or reception of the multiple PDSCHs if a row indicated by the DCI comprises a plurality of SLIVs.

16. The method of claim 14, wherein transmission of the multiple PDSCHs is configured via the SPS, and transmission of the multiple PUSCHs is configured via the CG.

17. The method of claim 14, wherein a new data indicator of the DCI comprises one bit if the first SLIV is utilized for activation of the SPS or the CG, wherein a size of a redundancy version (RV) field is based on a number of SLIVs.

18. An apparatus for wireless communication at a network node, comprising:
a memory; and
at least one processor coupled to the memory and configured to:
transmit downlink control information (DCI) comprising a time domain resource allocation (TDRA) assignment that is configured with multiple physical uplink shared channels (PUSCHs) or multiple physical downlink shared channels (PDSCHs); and
transmit the multiple PDSCHs or receiving the multiple PUSCHs based on a selected start and length indicator value (SLIV) of a TDRA row, wherein the selected SLIV of the TDRA row indicated by the TDRA assignment comprises one or more SLIVs to activate semi-persistent scheduling (SPS) or a configured grant (CG).

19. The apparatus of claim 18, further comprising a transceiver coupled to the at least one processor, wherein the transceiver is configured to transmit the DCI, and at least one of transmit the multiple PDSCHs or receive the multiple PUSCHs.

20. The apparatus of claim 18, wherein transmission of the multiple PDSCHs is configured via the SPS, and transmission of the multiple PUSCHs is configured via the CG.

21. The apparatus of claim 20, wherein the DCI schedules a single allocation for the SPS or the CG.

22. The apparatus of claim 21, wherein the single allocation for the SPS or the CG is configured via radio resource control (RRC) signaling, wherein the single allocation comprises a single PDSCH over the SPS or a single PUSCH over the CG.

23. The apparatus of claim 20, wherein the DCI schedules a plurality of allocations for each of the SPS or the CG.

24. The apparatus of claim 23, wherein the plurality of allocations for the SPS or the CG are configured via radio resource control (RRC) signaling, wherein the plurality of allocations comprise a plurality of PDSCHs over the SPS or a plurality of PUSCHs over the CG.

25. The apparatus of claim 18, wherein a new data indicator of the DCI comprises one bit if the selected SLIV is utilized for activation of the SPS or the CG, wherein a size of a redundancy version (RV) field is based on a number of SLIVs.

26. The apparatus of claim 25, wherein the size of the RV field comprises 2 bits where the number of SLIVs is one, wherein the size of the RV field comprises 2, 3, 4, 5, 6, 7, or 8 bits for a plurality of SLIVs and based on a maximum number of SLIVs in the TDRA assignment.

27. The apparatus of claim 25, wherein an uplink shared channel (UL-SCH) comprises one bit where the number of SLIVs is one, wherein the UL-SCH comprises zero bits for a plurality of SLIVs.

28. The apparatus of claim 25, wherein code block group (CBG) transmission information comprises 0, 2, 4, 6, or 8 bits where the number of SLIVs is one, wherein the CBG transmission information comprises zero bits for a plurality of SLIVs.

29. The apparatus of claim 18, wherein field sizes of the DCI are based on a maximum number of SLIVs among rows of the TDRA assignment.

30. A method of wireless communication at a network node, comprising:
transmitting downlink control information (DCI) comprising a time domain resource allocation (TDRA) assignment that is configured with multiple physical uplink shared channels (PUSCHs) or multiple physical downlink shared channels (PDSCHs); and
transmitting the multiple PDSCHs or receiving the multiple PUSCHs based on a selected start and length indicator value (SLIV) of a TDRA row, wherein the selected SLIV of the TDRA row indicated by the TDRA assignment comprises one or more SLIVs to activate semi-persistent scheduling (SPS) or a configured grant (CG).

* * * * *